United States Patent

Schodl

[15] 3,653,764
[45] Apr. 4, 1972

[54] COLORIMETER

[72] Inventor: Imre Schodl, Delft, Netherlands

[73] Assignee: Arie Hendrik Gerrit Van Leeuwen, Delft, Netherlands

[22] Filed: Jan. 22, 1970

[21] Appl. No.: 4,929

[52] U.S. Cl. .............................. 356/72, 250/217, 356/173, 356/186, 356/217
[51] Int. Cl. .................... G01n 21/00, G01j 3/46, G01j 3/48
[58] Field of Search .................. 356/217, 173, 180, 184, 186, 356/188, 211; 250/217 R

[56] References Cited

UNITED STATES PATENTS

| | | | |
|---|---|---|---|
| 2,521,890 | 9/1950 | Alexander | 356/215 X |
| 2,898,802 | 8/1959 | Ljungberg et al. | 356/180 |
| 3,089,382 | 5/1963 | Hecht et al. | 356/188 X |
| 3,377,467 | 4/1968 | Staunton et al. | 356/173 X |
| 3,445,167 | 5/1969 | Armstrong et al. | 356/211 X |
| 3,458,261 | 7/1969 | Bentley et al. | 356/211 X |
| 3,490,849 | 1/1970 | Hambleton | 356/188 X |
| 3,495,916 | 2/1970 | Morgan | 336/215 |

FOREIGN PATENTS OR APPLICATIONS

| | | | |
|---|---|---|---|
| 1,143,904 | 10/1957 | France | 336/215 |

Primary Examiner—Ronald L. Wibert
Assistant Examiner—Warren A. Sklar
Attorney—Ernest A. Greenside

[57] ABSTRACT

This invention relates to a colorimeter with a light source which through a sample to be investigated illuminates a photoelectric transducer, the output of which is connected to a measuring device for measuring the intensity of the transmitted light. The light source is operated from a supply source which is effective to intermittently energize and de-energize the light source, the de-energized periods of the light source being at least as long as the energized periods.

3 Claims, 2 Drawing Figures

COLORIMETER

The invention relates to a colorimeter with a light source which through a sample to be investigated illuminates a photo-electric transducer, the output of which is connected to a measuring device for the intensity of the transmitted light.

Especially in the medical field, there is a need for a colorimeter with high sensitivity and accuracy, which can be read easily and which is able to perform measurements on small samples. An accurate and easy reading can be obtained by indicating the measuring results by means of a digital display device rather than a pointer instrument. However, with existing instruments it appears in those cases that the reading, especially when using small samples of 100 microliters or less, is very unstable. Especially with a digital display, this is very troublesome. For instance, it is virtually impossible to obtain a comprehensible display if the value indicated is jumping irregularly. The invention aims at providing a colorimeter of the kind referred to hereinabove, which makes possible a much better stability than known devices. The invention is based upon the recognition that the undesired instabilities are caused for a large part by the heat generation of the light source, which not only causes temperature variations of the small sample which are difficult to control, which of course has an important influence on the measuring results, but which also influences the temperature of any filter used, the light source itself and the photo-electric transducer, which temperature variations also appear deleteriously to influence the measuring results and thereby the stability.

The invention is characterized in that the light source is supplied from a supply source which is switched on intermittently, the de-energized periods of the light source being at least as long as the energized periods.

Because the light source is energized only during a part of its operation, which part can be diminished virtually as desired, the total heat dissipation in the colorimeter is correspondingly lower, so that the stability is improved correspondingly. It turns out to be possible in this way, to obtain even better results than by means of very comple and expensive measures for removing the generated heat.

The fact that the light source is not energized continuously, on the other hand makes necessary special measures for preventing the necessarily fluctuating radiation characteristics of the light source from introducing inaccuracies and instabilities in their turn. With an incandescent lamp as light source, the radiation output and the color temperature of the light source vary strongly during heating-up of the filament and measures must be taken for ensuring that this has no unfavorable influence on the measuring results. Also, if an incandescent lamp is connected to the full supply voltage in cold condition, it initially takes up a very large current and even though the filament is heated up rapidly thereby, this has an unfavorable influence on the length of life of the incandescent lamp, while also undesirable variations of the radiation properties occur.

When using an incandescent lamp as radiation source it therefor is preferred that the supply source during the energization periods initially supplies a stabilized current and subsequently for some time supplies a constant voltage, after which the energization is terminated. Thereby, an excessive surge current is avoided and after switching the incandescent lamp on, its supply voltage remains constant for some time, so that if the switching-on period is chosen sufficiently long, constant radiation characteristics of the incandescent lamp can be obtained during the period of constant supply voltage.

For ensuring that the measurement is effected only during a period in which the radiation characteristics of the light source are constant, it is preferred to connect a gate circuit between the transducer and the measuring device, which gate circuit passes the output signal of the transducer only during a part of the energization period of the light source, in which the supply voltage is constant. Not only does that gate select that part of the signal which occurs in a period in which the desired radiation characteristics of the light source exist, but that gate circuit also makes the signal better suited for being amplified in an AC amplifier, which possibly can be integrated with the gate circuit, which is important, since an AC amplifier can attain a high stability much more easily than a DC amplifier.

The invention is elucidated below with reference to the drawing, which relates to an embodiment of a colorimeter according to the invention.

Figure 1:
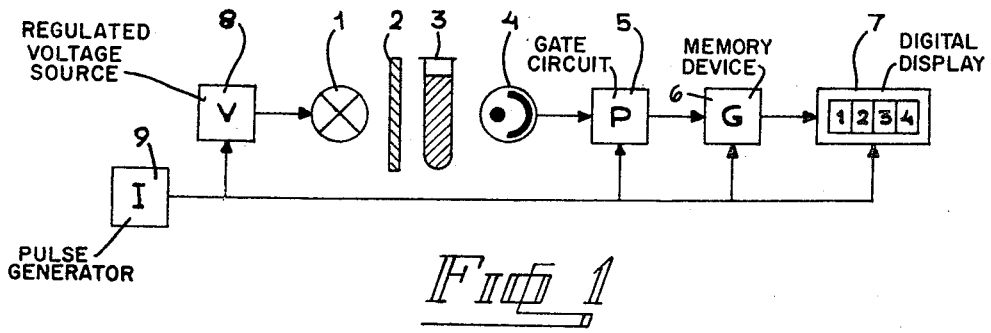
FIG. 1 is a block diagram of a colorimeter according to the invention.
Figure 2:
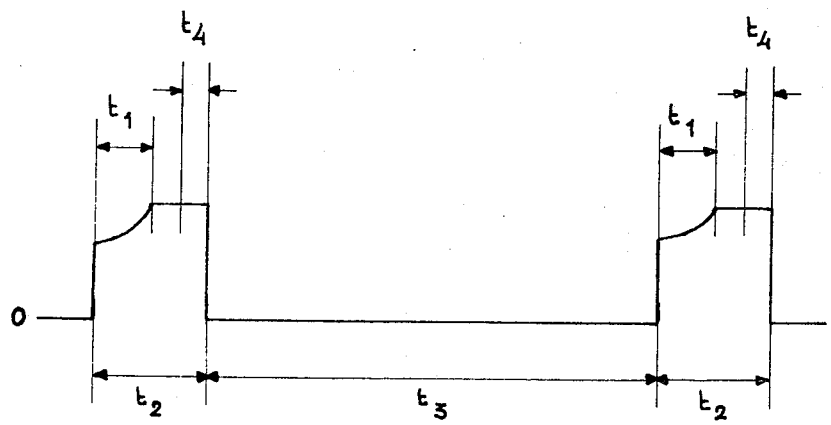
FIG. 2 is a diagram of the energization of the light source as a function of the time.

The light source 1 in FIG. 1, which consists of an incandescent lamp, throws its light through an optical filter 2 and the microsample 3 on to a photocell for serving as photo-electric transducer, which through a gate circuit 5 and a memory 6 applies its output signal to a digital display device 7. The incandescent lamp 1 is supplied from a regulated supply source 8 which in turn is controlled by a pulse generator 9, whereby the output voltage of the supply source 8 has a wave form as shown in FIG. 2.

By the action of the pulse generator 9, the output voltage of the supply source 8, during the interval $t_1$ gradually rises form zero to the maximum value, because the energization current is kept constant during that interval and the resistance of the incandescent lamp filament rises when heating-up, after which the supply voltage remains constant during the remainder of the energization period $t_2$ of the light source 1 and at the end thereof abruptly terminates. Subsequently, the supply voltage remains switched off during the quiescent period $t_3$ and thereafter again rises gradually etc. The gradual rise of the supply voltage during the period $t_1$ prevents the occurrence of excessive surges when switching on, prolongs the life of the incandescent lamp 1 and improves its radiation characteristics. The pulse source 9 also controls the gate circuit 5, which passes and amplifies the output signal of the photocell 4 only during the periods $t_4$ in which the supply voltage for the lamp is already constant for some time and the radiation characteristics of the incandescent lamp 1 and therefore also constant.

The output signal of the gate circuit 5 thereby consists of pure rectangular pulses, which are excellently suited for a stable amplification. These rectangular pulses are applied to the memory 6, which can simply consist of a capacitor and which also after the end of the gating period $t_4$ stores the output signal, so that this is continuously indicated by the digital display device 7. Upon each new measuring period, the memory 6 is cleared by the pulse generator 9 and moreover, the digital display device 7 is reset by the pulse source 9. The internal design of the various components shown in FIG. 1 needs no further elucidation, since suitable embodiments are known and obtainable on the market.

What I claim is:

1. A colorimeter comprising a light source having a variable resistance to electric current when energized thereby, a regulated pulsed source of constant current and voltage supplied to said light source for intermittently energizing the same, said light source, when energized, by virtue of its variable resistance having a first gradually rising level of intensity for a first finite time and a second constant level of intensity for a second finite time, a photo-electric transducer positioned in relation to said light source and to a sample to be analyzed to intercept the radiation from said light source passing through said sample for producing an output electrical signal, a gate circuit connected to said source and to the output of said transducer for passing, during that period only when the supply voltage of said pulsed source is constant, that portion of the output electrical signal only, corresponding to a terminal segment of said second constant level of intensity of said light source, and a digital display device operatively connected to said gate circuit for displaying a measure of the sample corresponding to that portion of the output signal passed by the gate circuit.

2. A colorimeter according to claim 1 wherein said light source comprises an incandescent lamp and said regulated pulsed source of constant current and voltage comprises a regulated source of current and a pulse generator connected to said source of current.

3. A colorimeter according to claim 2, further comprising a memory device connected to the gate circuit and having applied thereto the output of said gate circuit for storing said output before display by said display device, said pulse generator being operatively connected (a) to said gate circuit for controlling operation thereof, (b) to said display device for resetting the same and (c) to said memory device for clearing the same.

* * * * *